(12) United States Patent
Hong et al.

(10) Patent No.: US 11,009,907 B2
(45) Date of Patent: May 18, 2021

(54) PORTABLE INFORMATION HANDLING SYSTEM USER INTERFACE SELECTION BASED ON KEYBOARD CONFIGURATION

(71) Applicant: Dell Products L.P., Round Rock, TX (US)

(72) Inventors: Jung Hwan Hong, Austin, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/251,279

(22) Filed: Jan. 18, 2019

(65) Prior Publication Data
US 2020/0233451 A1 Jul. 23, 2020

(51) Int. Cl.
*G06F 1/16* (2006.01)

(52) U.S. Cl.
CPC ............ *G06F 1/162* (2013.01); *G06F 1/1624* (2013.01); *G06F 1/1667* (2013.01); *G06F 1/1669* (2013.01); *G06F 1/1681* (2013.01); *G06F 1/1694* (2013.01)

(58) Field of Classification Search
CPC ...... G06F 1/162; G06F 1/1624; G06F 1/1667; G06F 1/1681; G06F 1/1694
See application file for complete search history.

(56) References Cited

U.S. PATENT DOCUMENTS

| | | | |
|---|---|---|---|
| 6,016,176 A | 1/2000 | Kim et al. | |
| 6,262,785 B1* | 7/2001 | Kim | G06F 1/1641 349/58 |
| 6,295,038 B1 | 9/2001 | Rebeske | |
| 6,643,124 B1 | 11/2003 | Wilk | |
| 6,667,877 B2 | 12/2003 | Duquette | |
| 6,667,878 B2 | 12/2003 | Ponx | |
| 6,700,773 B1* | 3/2004 | Adriaansen | G06F 1/1618 345/156 |
| 6,765,553 B1* | 7/2004 | Odamura | G06F 1/1626 345/156 |
| 7,061,472 B1 | 6/2006 | Schweizer et al. | |
| 7,136,282 B1 | 11/2006 | Rebeske | |
| 7,453,418 B2* | 11/2008 | Palmquist | G06F 1/1601 345/1.1 |
| 7,489,503 B2* | 2/2009 | Maatta | G06F 1/1616 16/367 |
| 7,606,553 B2 | 10/2009 | Konaka | |
| 7,633,744 B2 | 12/2009 | Kuhn | |
| 7,821,780 B2 | 10/2010 | Choy | |
| 7,885,431 B2 | 2/2011 | Kim | |
| 8,259,080 B2 | 9/2012 | Casparian et al. | |

(Continued)

*Primary Examiner* — Abhishek M Rathod
*Assistant Examiner* — Keith DePew
(74) *Attorney, Agent, or Firm* — Zagorin Cave LLP; Robert W. Holland

(57) ABSTRACT

A portable information handling system user interface adapts based upon a position of a keyboard, such as a position detected by accelerations, Hall sensors, ambient light sensors and/or touchscreen display touches. In one example embodiment, a visual indication presented at a display aids end user location of a keyboard in a hidden position, such as a sliding keyboard disposed under a housing portion or a membrane keyboard integrated in a housing portion lower surface and exposed by a disconnect and flip motion.

7 Claims, 10 Drawing Sheets

(56) References Cited

U.S. PATENT DOCUMENTS

| | | |
|---|---|---|
| 8,515,496 B2 | 8/2013 | Cheng et al. |
| 8,654,030 B1 | 2/2014 | Mercer |
| 8,724,301 B2 * | 5/2014 | Mahmoud .................. G06F 3/02 361/679.04 |
| 8,781,522 B2 | 7/2014 | Tran et al. |
| 8,849,217 B2 | 9/2014 | Rousu et al. |
| 9,047,047 B2 | 6/2015 | Visosky |
| 9,071,673 B2 | 6/2015 | Choi et al. |
| 9,213,517 B2 | 12/2015 | Sirpal et al. |
| 9,310,905 B2 * | 4/2016 | Luo ...................... G06F 3/03547 |
| 9,432,070 B2 | 8/2016 | Mercer |
| 9,547,341 B2 | 1/2017 | Aono |
| 9,639,177 B2 | 5/2017 | Kim et al. |
| 9,864,567 B2 | 1/2018 | Seo |
| 9,871,544 B2 | 1/2018 | Mercer et al. |
| 9,949,218 B1 | 4/2018 | Lau |
| 9,983,632 B2 * | 5/2018 | Kuscher ................ G06F 1/1662 |
| 10,013,038 B2 * | 7/2018 | Mercer ................. G06F 1/1654 |
| 10,033,087 B2 | 7/2018 | Sultenfuss et al. |
| 10,042,391 B2 | 8/2018 | Yun et al. |
| 10,114,409 B2 * | 10/2018 | Michino ................. H04M 1/04 |
| 10,164,679 B1 * | 12/2018 | Rajagopalan ........ H04B 1/3827 |
| 10,254,803 B1 * | 4/2019 | Quinn .................. G06F 1/1643 |
| 10,296,052 B1 * | 5/2019 | Quinn .................. G06F 3/1423 |
| 10,416,719 B2 | 9/2019 | Chun et al. |
| 10,503,215 B1 * | 12/2019 | Quinn .................. G06F 3/1423 |
| 10,686,259 B2 | 6/2020 | Kim et al. |
| 10,740,058 B2 | 8/2020 | Sirpal et al. |
| 10,756,414 B2 | 8/2020 | Ramasamy |
| 2002/0024499 A1 * | 2/2002 | Karidis ................ G06F 1/1632 345/156 |
| 2002/0118175 A1 * | 8/2002 | Liebenow ............ G06F 3/0236 345/168 |
| 2003/0048205 A1 * | 3/2003 | He ........................ G06F 1/1662 341/26 |
| 2003/0218577 A1 | 11/2003 | Wang |
| 2004/0049743 A1 | 3/2004 | Bogward |
| 2004/0052044 A1 | 3/2004 | Mochizuki et al. |
| 2004/0108968 A1 * | 6/2004 | Finke-Anlauff ...... G06F 1/1669 345/1.1 |
| 2004/0208681 A1 * | 10/2004 | Dechene ............... G06F 1/1662 400/472 |
| 2005/0125570 A1 | 6/2005 | Olodort et al. |
| 2006/0073859 A1 * | 4/2006 | Chou ................. H04M 1/0235 455/575.4 |
| 2006/0082518 A1 | 4/2006 | Ram |
| 2006/0104013 A1 * | 5/2006 | Sakakibara ........... G06F 1/1656 361/679.11 |
| 2006/0109250 A1 | 5/2006 | Prichard et al. |
| 2006/0211459 A1 | 9/2006 | Kubo |
| 2007/0205338 A1 | 9/2007 | Sabatino |
| 2007/0216640 A1 * | 9/2007 | Chen ..................... G06F 3/0233 345/156 |
| 2007/0247432 A1 | 10/2007 | Oakley |
| 2008/0015031 A1 | 1/2008 | Koizumi |
| 2008/0062625 A1 | 3/2008 | Batio |
| 2008/0117572 A1 | 5/2008 | Maatta |
| 2008/0139118 A1 | 6/2008 | Sanguinetti |
| 2008/0247128 A1 | 10/2008 | Khoo |
| 2009/0249247 A1 | 10/2009 | Tseng et al. |
| 2010/0064244 A1 * | 3/2010 | Kilpatrick, II ........ G06F 1/1649 715/773 |
| 2010/0085382 A1 * | 4/2010 | Lundqvist ............. G06F 3/1438 345/659 |
| 2010/0088532 A1 | 4/2010 | Pollock et al. |
| 2010/0188299 A1 | 7/2010 | Rinehart et al. |
| 2010/0321275 A1 | 12/2010 | Hinckley et al. |
| 2011/0002096 A1 | 1/2011 | Thorson |
| 2011/0050975 A1 | 3/2011 | Chung |
| 2011/0115713 A1 | 5/2011 | Altman et al. |
| 2011/0143769 A1 | 6/2011 | Jones et al. |
| 2011/0151935 A1 | 6/2011 | Oksman et al. |
| 2011/0176260 A1 | 7/2011 | Walters et al. |
| 2011/0187646 A1 * | 8/2011 | Mahmoud ................ G09G 5/00 345/168 |
| 2011/0216064 A1 * | 9/2011 | Dahl ..................... G06F 1/1677 345/428 |
| 2011/0320405 A1 | 12/2011 | Hsu et al. |
| 2012/0032877 A1 * | 2/2012 | Watkins, Jr. .......... G06F 1/1624 345/156 |
| 2012/0075166 A1 | 3/2012 | Marti et al. |
| 2012/0081306 A1 | 4/2012 | Sirpal et al. |
| 2012/0113579 A1 | 5/2012 | Agata et al. |
| 2012/0139815 A1 | 6/2012 | Aono et al. |
| 2012/0194448 A1 | 8/2012 | Rothkopf |
| 2012/0313865 A1 | 12/2012 | Pearce |
| 2013/0017526 A1 | 1/2013 | Nguyen et al. |
| 2013/0027886 A1 | 1/2013 | Crooijmans et al. |
| 2013/0076595 A1 | 3/2013 | Sirpal et al. |
| 2013/0148282 A1 | 6/2013 | Chen |
| 2013/0286623 A1 | 10/2013 | Slipy et al. |
| 2014/0101578 A1 * | 4/2014 | Kwak .................. G06F 1/1647 715/761 |
| 2014/0123436 A1 | 5/2014 | Griffin et al. |
| 2014/0184628 A1 | 7/2014 | Lee |
| 2014/0355197 A1 | 12/2014 | Aruga et al. |
| 2014/0357313 A1 | 12/2014 | Mercer et al. |
| 2014/0375530 A1 | 12/2014 | Delaporte |
| 2014/0376179 A1 | 12/2014 | Jenkins et al. |
| 2015/0130725 A1 | 5/2015 | Knepper et al. |
| 2015/0192954 A1 | 7/2015 | Kang et al. |
| 2017/0017273 A1 * | 1/2017 | Weldon ................ G06F 1/1681 |
| 2017/0185177 A1 | 6/2017 | Rane |
| 2017/0206861 A1 | 7/2017 | Rojas |
| 2017/0371474 A1 * | 12/2017 | Ligameri ............ G06F 3/03545 |
| 2018/0120896 A1 | 5/2018 | Wallace |
| 2018/0210515 A1 * | 7/2018 | Lyles .................... G06F 1/1618 |
| 2019/0042066 A1 | 2/2019 | Kim et al. |
| 2019/0339744 A1 | 11/2019 | Oakley |
| 2019/0369859 A1 * | 12/2019 | McClean ............ G06K 9/00416 |
| 2020/0064892 A1 * | 2/2020 | Iyer ..................... G06F 1/1618 |
| 2020/0089285 A1 * | 3/2020 | Gilbert ............... H01H 13/7006 |
| 2020/0110470 A1 * | 4/2020 | Meyers ................ G06F 3/0202 |

\* cited by examiner

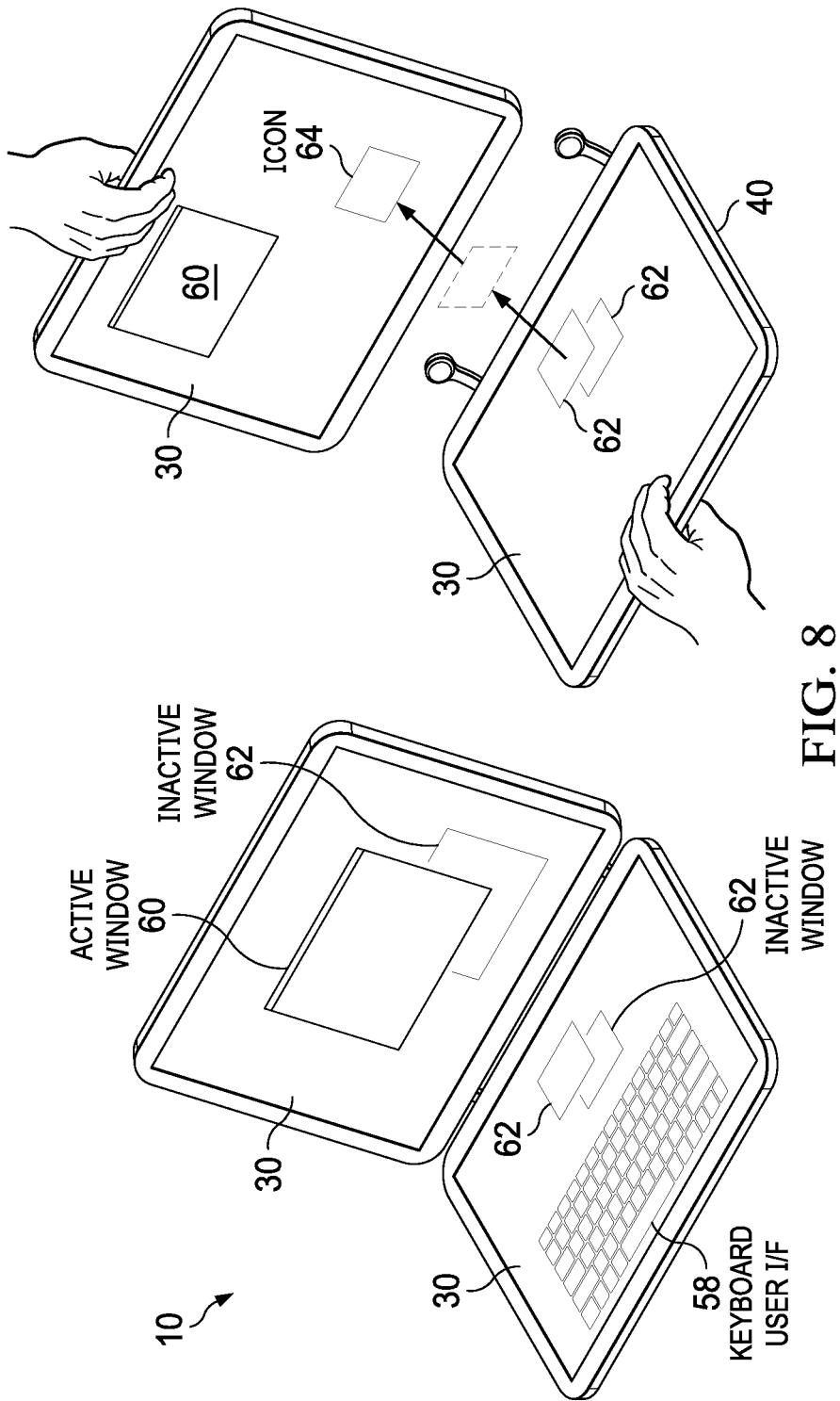

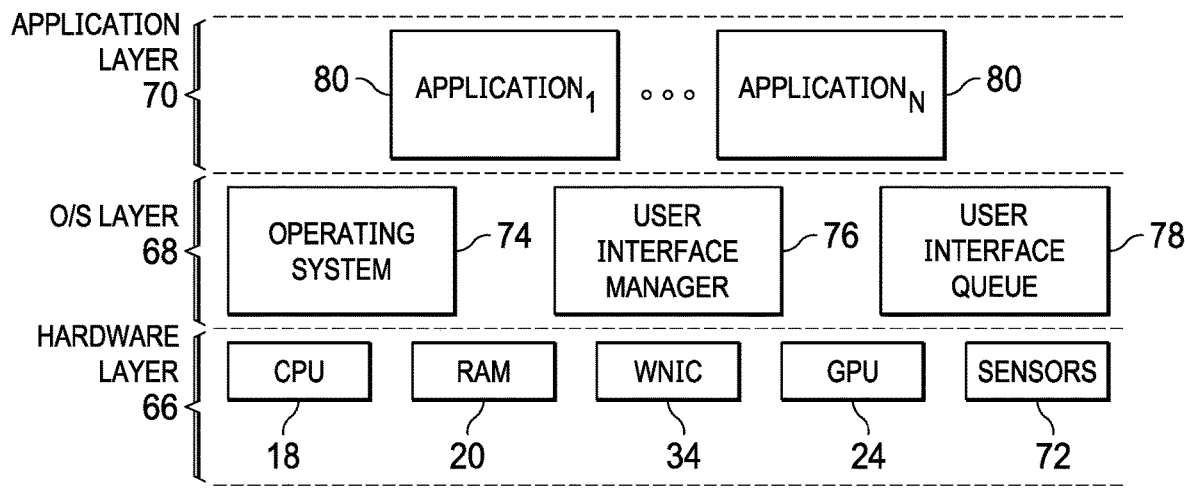
FIG. 9
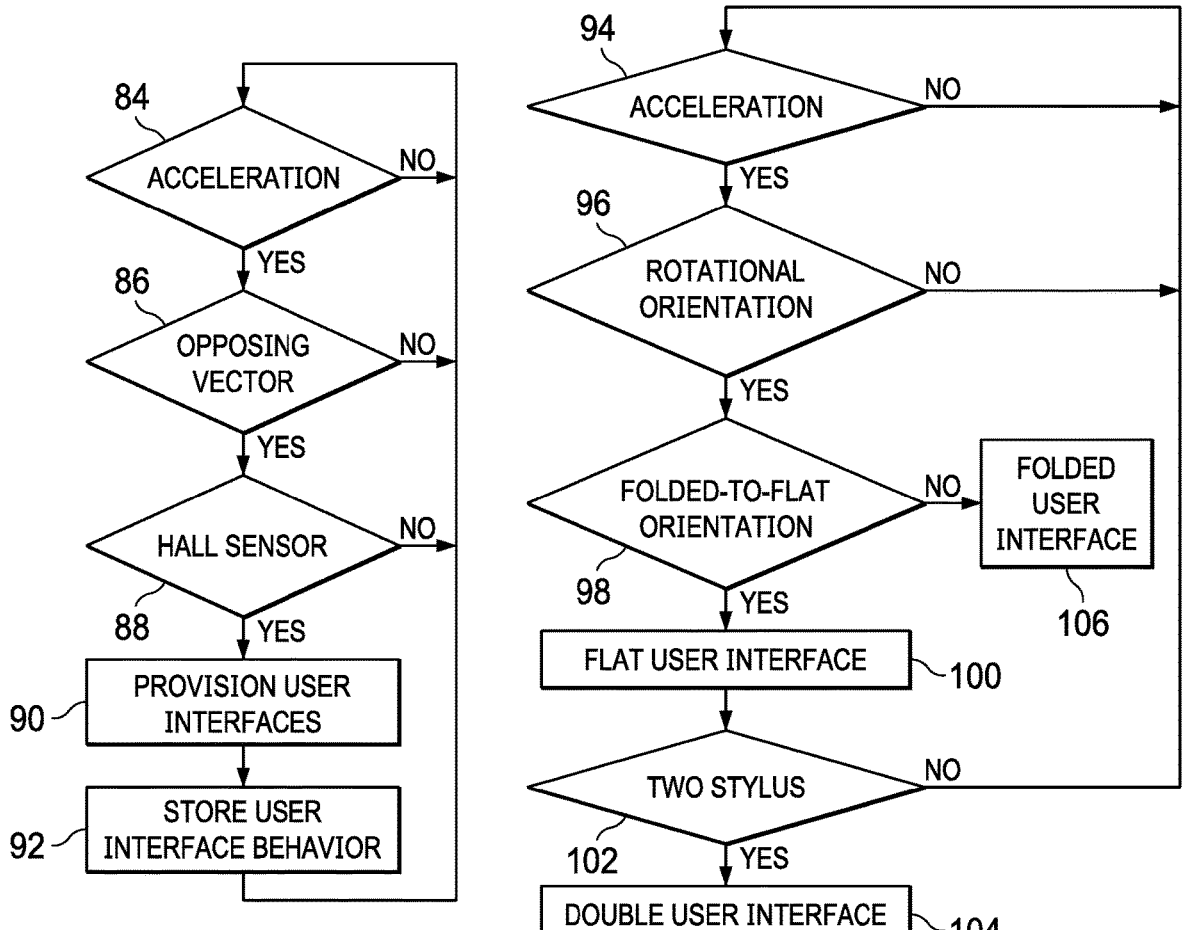
FIG. 10
FIG. 11

PORTABLE INFORMATION HANDLING SYSTEM USER INTERFACE SELECTION BASED ON KEYBOARD CONFIGURATION

CROSS REFERENCE TO RELATED APPLICATION

U.S. patent application Ser. No. 16/251,298, filed Jan. 18, 2019, entitled "Information Handling System See Do User Interface Management" by inventors, Jung Hwan Hong and Deeder Aurongzeb, describes exemplary methods and systems and is incorporated by reference in its entirety.

U.S. patent application Ser. No. 16/251,311, filed Jan. 18, 2019, entitled "Portable Information Handling System to All-In-One Transformation" by inventors Jung Hwan Hong and Deeder Aurongzeb, describes exemplary methods and systems and is incorporated by reference in its entirety.

U.S. patent application Ser. No. 16,251,331, filed Jan. 18, 2019, entitled "Asymmetric Information Handling System User Interface Management" by inventors Jung Hwan Hong and Deeder Aurongzeb, describes exemplary methods and systems and is incorporated by reference in its entirety.

BACKGROUND OF THE INVENTION

Field of the Invention

The present invention relates in general to the field of portable information handling systems, and more particularly to a portable information handling system user interface selection based on keyboard configuration.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems process information with components disposed in one or more housings. A tablet information handling system generally has a planar housing that contains processing components disposed under a flat panel display. Convertible information handling systems generally have two rotationally-coupled housing portions with one housing portion containing a display and the other containing the processing components covered by a keyboard. The keyboard offers an end user with a convenient input device to type inputs to applications through user interfaces. Generally, convertible information handling systems rotate to a clamshell position to expose the display in an elevated position above the keyboard so that an end user can type inputs to the keyboard while viewing the display. Some convertible information handling systems support 360 degrees of rotation of the display so that a touchscreen of the display can act as a tablet with the keyboard hidden below the system bottom surface.

Over time, portable information handling systems have evolved to have thin housing structures with reduced weight. Generally an end user selects a system with a width and length sufficient to contain a display of desired size. Reduced system height effectively became the only way to reduce system size for a give display size. Another way to diminish system size is to replace the keyboard at the upper surface of the base housing with a display. Having a display in the system base still allows typed inputs by presenting a virtual keyboard at the display that accepts typed inputs through a touchscreen.

Placing a display over both rotationally coupled housing portions increases the display area in flat rotational orientation, however, typed inputs at a display touchscreen tend to be less efficient as no physical feedback is provided to an end user. One option is to place the keyboard in a different location for access when typing is needed and out of the way when a display area is needed. Hiding a keyboard tends to confuse end users since the display portions may each act as a display area or virtual keyboard presentation. An end user faces increased complexity when rotating housing portions to different configurations due to the different types of user interfaces that may be used at an information handling system.

SUMMARY OF THE INVENTION

Therefore, a need has arisen for a system and method which adapts user interfaces across multiple display surfaces of multiple display portions based on user intent derived from sensed content.

In accordance with the present invention, a system and method are provided which substantially reduce the disadvantages and problems associated with previous methods and systems for presenting content at user interfaces. A user interface manager executing on an information handling system applies sensed context to adapt user interfaces presented at different housing portions having different display portions to interact with an end user based on end user intent.

More specifically, a portable information handling system processes information with components disposed in housing portions that are rotationally coupled to each other by a hinge. Plural sensors associated with each of the housing portions senses a context related to the housing portions that a user interface manager applies to adapt presentation of user interfaces at the display portions. Sensors may include accelerometers, magnetometers, cameras, gaze trackers, Hall sensors, etc. . . . that measure relative orientation of each housing portion to an end user and to each other. In one embodiment, a physical keyboard having physical keys transitions between hidden and exposed positions to accept end user inputs. Accelerations detected at the keyboard and housing portion are compared and resolved to detect a separation vector that indicates movement of the keyboard between hidden and exposed positions. The keyboard relative position is confirmed with other sensors, such as a Hall sensor that detects relative position of a magnet in the keyboard or an ambient light sensor that detects a reduction in ambient light as a display portion is flipped to expose a keyboard on an opposing side. The user interface manager selects user interfaces to present from a user interface queue that associates sensed context and available applications to user interfaces. As housing portions and keyboards reconfigure in orientation, attach and detach, the user interface manager applies sensed context to create a user interface environment from plural housing portions that interact as building blocks to achieve an end user intent, including collaborative user interaction experiences.

The present invention provides a number of important technical advantages. One example of an important technical advantage is that a portable information handling system adapts user interface presentation at separate display portions to meet end user intent. Sensed context is applied to adjust user interfaces presented in a collaborative way between housing portions that each have a display portion. Housing portions change their relative orientation both by rotating about a hinge that couples the housing portions together and selectively detaching and attaching to the hinge. The effect is to have a changing display surface based upon the relative rotational orientation of the housing portions so that an end user can quickly transition between a clamshell mode associated with a folded housing orientation and a tablet mode associated with a flat housing orientation. Each housing portion essentially provides a flexible building block that enhances end user interaction needs based on end user input intent. A keyboard that accepts typed inputs couples to a housing portion to transition between exposed and hidden positions as desired by the end user. The sensed context includes accelerations sensed at the keyboard and housing portions that indicate an end user intent to interact through selected user interface configurations.

A "see" "do" ecosystem is created by context driven allocation of user interfaces between separate but collaborative display portions. Rapid transition between one or multi-user configurations is provided by either separating the housing portions to assign display portions to separate users or having multiple users interact with different display portions in a flat configuration. As an end user manipulates housing portions to different relative orientations, user interfaces automatically allocate to different display portions based upon each user's see or do association. For instance, placing a portable system to have one housing portion in a horizontal orientation and the other portion in a vertical orientation assigns an application user interface associated with stylus inputs to the horizontal portion while visually consumed information is placed on the vertical portions, such as a file list. Rotation of both portions to a flat orientation extends the stylus user interface across both display portions to provide the end user with a larger working area. Detection of multiple stylus devices indicates multiple end users and provides multiple user interfaces to provide separate but collaborative work space.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 8 depicts an example embodiment of a portable information handling system provisioning of a user interface between a clamshell rotational orientation and detachment into two separate housing portions;

FIG. 9 depicts a block diagram of information handling system component interactions to support context sensing and user interface provisioning;

FIG. 10 depicts a flow diagram of a process for detecting a user interface provisioning trigger at a portable information handling system;

FIG. 11 depicts a flow diagram of a process for selecting see and do user interface scale in a multi-display and multi-user environment;

DETAILED DESCRIPTION

Portable information handling systems determine a context from sensed conditions and apply the context to manage user interface presentation at separate display portions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
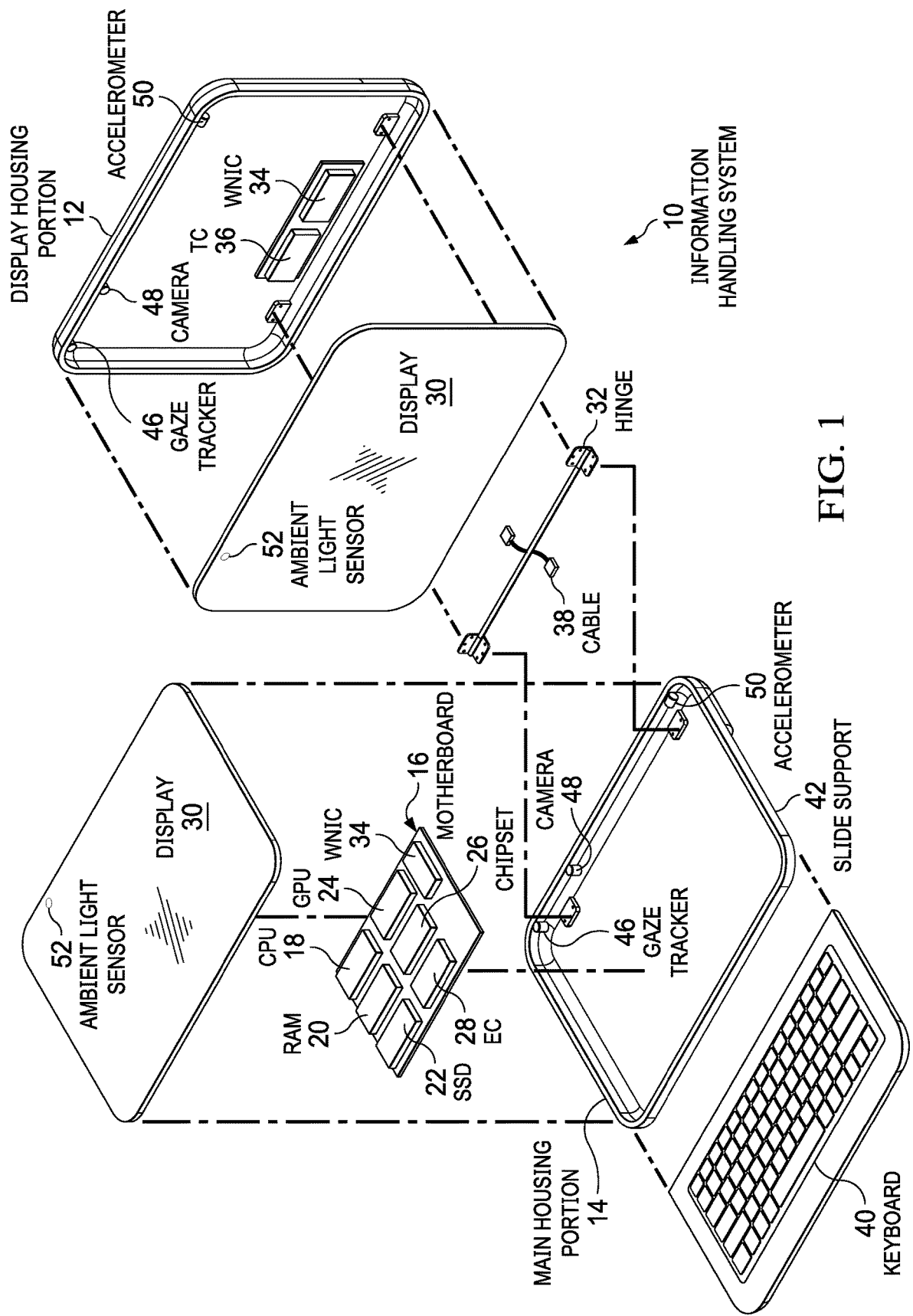
FIG. 1 depicts an exploded view of a portable information handling system having dual display portions and a sliding keyboard assembly.

Referring now to FIG. 1, an exploded view depicts a portable information handling system 10 having dual display portions 30 and a sliding keyboard assembly. In the example embodiment, portable information handling system 10 has a display housing portion 12 rotationally coupled to a main housing portion 14 by a dual axis hinge 32. A motherboard 16 coupled to main housing portion 14 supports components that cooperate to process information. In the example embodiment, a central processing unit (CPU) 18 couples to motherboard 16 and executes instructions stored in random access memory (RAM) 20 to process information. For instance, a solid state drive (SSD) 22 provides non-transient memory, such as flash memory, that stores an operating system and applications for execution on CPU 18. A graphics processing unit (GPU) 24 interfaces with CPU 18 and RAM 20 to further process information to defined visual images for presentation at a display 30. For instance, GPU 24 defines pixel values that illuminate pixels of display 30 with colors to form a visual image. A chipset 26 manages operation of CPU 18, such as by managing clock speeds, memory accesses and graphic information interfaces. An embedded controller 28 manages physical operations at motherboard 16, such as power supply and input/output (I/O) device interfaces. I/O devices may include integrated and peripheral keyboards, mouse, touchpad, touchscreen and other devices.

In the example embodiment, visual images defined by GPU 24 are presented at display portions 30 disposed over each of lid housing portion 12 and main housing portion 14. For instance, a motherboard 16 connection to the display portion 30 disposed over main housing portion 14 may scan the visual image. Lid housing portion 12 may have pixel values provided by GPU 24 communicated through wireless signals of wireless network interface cards (WNIC) 34, such as a 60 GHz wireless interface, or a cable 38 wire interface. A timing controller 36 receives the pixel values to scan to pixels of display portion 30. Display portions 30 act as a single display disposed over separate housing portions 12 and 14 by having GPU 24 define pixel values for presentation of visual images based upon information selected for presentation by CPU 18, such as with an operating system driver. In the example embodiment, display portions 30 are separate pieces, such as separate LCD flat panels; however, in alternative embodiments a single foldable OLED display film may be disposed over both housing portions 12 and 14 to fold across hinge 32.

A keyboard 40 couples to a bottom surface of main housing portion 14 with a slide support 42 that slides keyboard 40 between a hidden position and an exposed position. For instance, the upper surface of keyboard 40 has membrane keys that accept typed inputs when keyboard 40 slides from underneath main housing portion 14 outward to the exposed position. When keyboard 40 slides underneath main housing portion 14, the membrane keys are hidden under the main housing portion bottom surface with the bottom surface of keyboard 40 blending into the bottom surface of main housing portion 14. As described in greater depth below, in alternative embodiments keyboard 40 may have keys at the bottom surface of main housing portion 14 in a hidden position so that keyboard 40 transitions to an exposed position by detaching the housing portions at hinge 32 and flipping main housing portion to place keyboard 40 face up in a clamshell configuration under lid housing portion 12.

Retraction and extension of keyboard 40 between hidden and exposed positions allows an end user to leverage "see" and "do" functions of information handling system 10. For instance, where an end user's main interactions are "see" interactions that consume visually presented information, keyboard 40 may be retracted to a hidden position out of the end user's way. As the end user seeks to perform "do" tasks that involved keyed inputs, extension of keyboard 40 to an exposed position provides keyboard 40 as an input device. One difficulty with having a keyboard 40 that transitions between hidden and exposed positions is that different user interfaces may optimize an end user experience based upon whether keyboard 40 is exposed or hidden. Another difficulty is that an end user may not know the position of keyboard 40 when in the hidden position. For instance, from an end user perspective, display portions 30 may each act as a base or lid or may be rotated to a flat orientation to act as a single tablet. An end user who picks up information handling system 10 with keyboard 40 in the hidden position may not know where the keyboard is accessed to transition to an exposed position.

A number of sensors integrate in information handling system 10 that provide a sensed context for orienting an end user to a system configuration and adapting user interfaces presented at display portions 30 for see and do functions. In the example embodiment, a gaze tracker 46 couples to each of housing portions 12 and 14 to sense an end user gaze relative to each housing portion. For instance, a gaze tracker detects the different reflections at an end user eye so that eye alignment provides an estimate of end user view alignment relative to a housing portion. Similarly, estimated end user alignment at each housing portion 12 and 14 provides an estimate of the housing portion alignment to each other. A camera 48 in each housing portion 12 and 14 captures an image of a viewing area of the display portion 30 at each housing portion to estimate the number of viewers and their orientation to information handling system 10. Accelerometers 50 in each housing portion 12 and 14 and in keyboard 40 detect accelerations that help identify motions associated with specific system configurations. For instance, accelerations detected at keyboard 40 that have an opposing vector to accelerations of main housing portion 14 may indicate movement of keyboard 40 between exposed and hidden positions. As a result of detection of such opposing accelerations, information handling system 10 may adjust user interface configurations, such as by disambiguation of a touchscreen at a display portion 30 to ignore unintended touch inputs. As another example, display portion 30 over main housing portion 14 may transition from a do user interface having a virtual keyboard presented to accept inputs at a touchscreen to a see user interface having the keyboard removed. Ambient light sensors 52 associated with each display portion 30 may also be used to adapt user interfaces between see and do functions. For instance, if housing portions 12 and 14 are rotated to a clamshell orientation, ambient light on the base portion versus the vertical portion will provide different ambient light sense values, while a flat orientation will have similar values.

As an example, a microcontroller of information handling system 10, such as embedded controller 28, monitors accelerations at housing portions 12 and 14 to detect an acceleration vector that indicates a separation of the housing portions and/or keyboard 40. For instance, a perpendicular acceleration vector may be determined to detect keyboard 40 or housing separation as opposed to rotational motion of housing portions 12 and 14 about hinge 32. Actual motion of keyboard 40 may be confirmed with a Hall sensor or contact sensor that detects relative movement of keyboard 40 and main base housing section 14. A more complete context may be defined by applying relative housing portion orientation, gaze orientation, ALS ambient light measurements and other factors. Once transition of keyboard 40 is confirmed between exposed and hidden positions, an associated user interface is provisioned to display portions 30. For instance, a clamshell configuration with keyboard 40 slid to an exposed position may result in removal of a virtual keyboard from presentation at main housing portion 14 and replaced with an expanded application user interface at lid housing portion 12 display portion 30 and a touch pad at main housing portion 14 display portion 30. Alternatively, the user interface of lid housing portion 12 configures with an application that accepts typed inputs, such as a word processor, under the assumption that an end user will want to type inputs to a display portion having a vertical orientation while the display portion having a horizontal orientation in the same plane as keyboard 40 accepts touch inputs. As an end user adapts user interfaces at each display portion 30 with different keyboard 40 positions, the user interfaces are stored in association with a context so that the user interface may be recalled for presentation when the context is again sensed.

Figure 2:
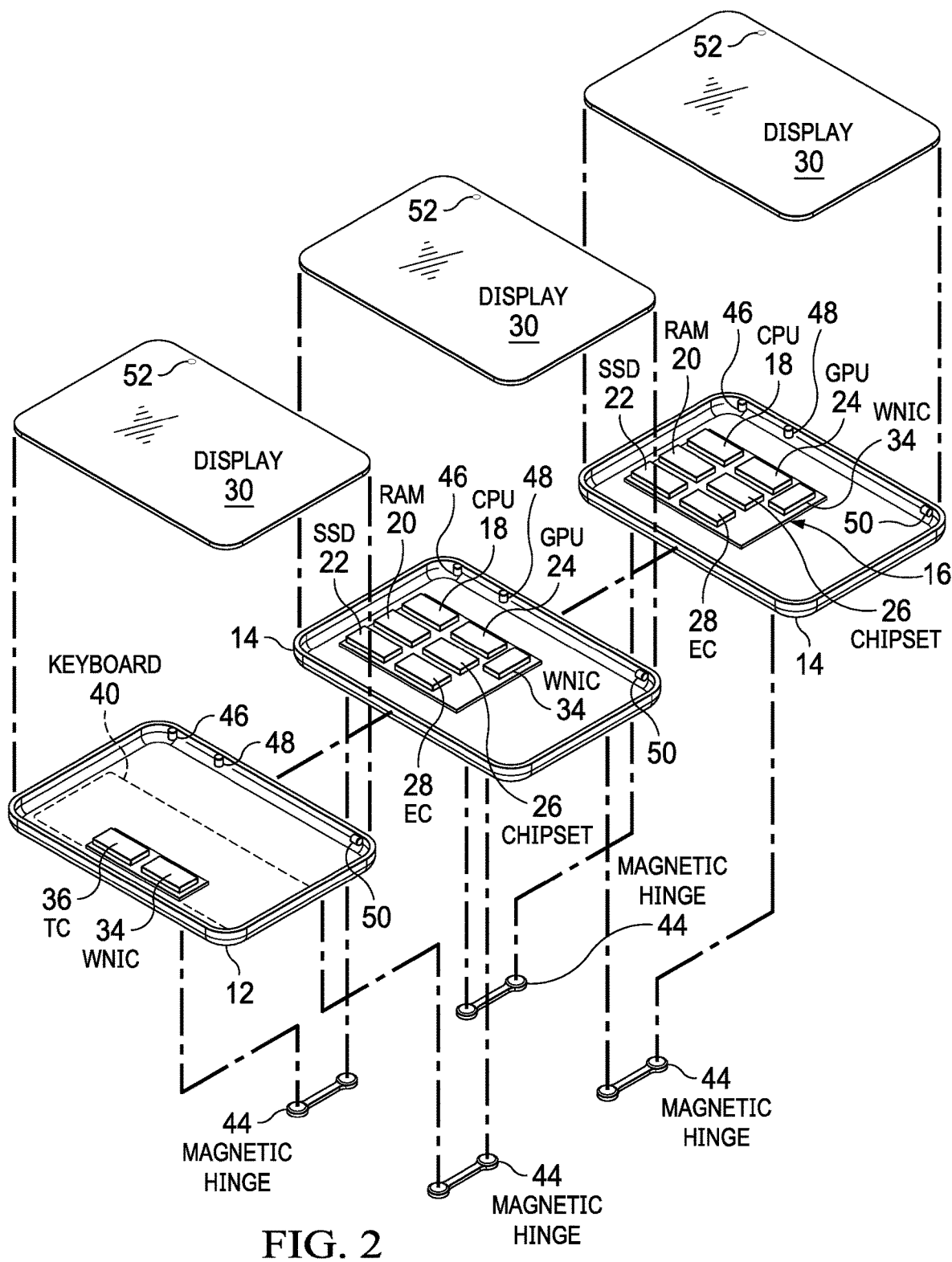
FIG. 2 depicts an exploded view of a portable information handling system having plural display portions assembled as modular units that attach and detach from each other.

Referring now to FIG. 2, an exploded view depicts a portable information handling system 10 having plural display portions 30 assembled as modular units that attach and detach from each other. In the example embodiment, three housing portions rotationally couple to each other about magnetic hinges 44 that magnetically couple to each housing portion. The two housing portions 12 and 14 are, essentially, independent tablet information handling systems that include a motherboard 16 and components to independently process information. When coupled to each other by magnetic hinges 44, the housing portions rotationally pivot between closed and flat configurations similar to a conventional portable information handling system. An operating system and applications executing on a CPU 18 of one of the housing portions 14 may define visual images presented at both display portions 30, such as by sending pixel values generated by one GPU 24 for presentation at a display portion 30 of the other housing portion 14.

In the example embodiment, a third housing portion 12 includes a display portion 30 on one side and an integrated keyboard 40 on an opposite side. Housing portion 12 couples with magnetic hinges 44 to either of the other housing portions 14 to provide additional display area for presenting information as visual images and a keyboard 40 to accept typed inputs. Selection of additional display area or the keyboard may be made in a number of different ways. For instance, an end user may rotate housing portion 12 relative to a housing portion 14 to place keyboard 40 in an exposed position over top of a display portion 30 while the other display portion is raised vertically in a clamshell mode. Alternatively, an end user may detach housing portion 12 from housing portion 14, flip housing portion 12 to expose keyboard 40, and then re-attach housing portion 12 to housing portion 14 so that keyboard 40 supports typed inputs to either of two exposed display portions 30.

Modular information handling system portions provide a convenient solution to end users by adapting display and input resources to see and do functions with selective attachment and detachment of housing portions 12 and 14. Sensed context at each housing portion 12 and/or 14 aids in automated deployment of user interfaces at display portions 30 to coordinate end user interactions with information handling system 10 in a manner that conforms with end user expectations. As an example, a perpendicular alignment of housing portions 14 with one display portion 30 held vertical in a viewing position indicates a see function is appropriate at the vertical display portion 30. A low sensed ambient light at the horizontal display portion 30 relative to ambient light sensed at the vertical display portion 30 indicates that housing portion 12 has folded about hinges 44 to rest on the horizontal display portion 30. If ambient light sensed at housing portions 14 have relatively similar values while ambient light sensed at housing portion 12 is low, a flat or clamshell orientation is indicated for the housing portions 12 with the keyboard 40 exposed to accept typed inputs. In such a configuration, a horizontal display portion 30 may be configured as a do user interface, such as to accept writing by a stencil, while the vertical display portion 30 may be configured as a see user interface, such as presenting a library of figures that a user may select to draw upon. In contrast, if both housing portions 14 lay horizontal in a flat position, the entire display across both display portions 30 may be configured as a single do user interface, such as to accept drawing inputs with a stylus. In an embodiment having three housing portions, an end user may have some difficulty tracking which housing portion has the keyboard 40. To aid in recognition of the housing portion having the keyboard, an icon may be presented at the housing portion that has the keyboard.

Figure 3:
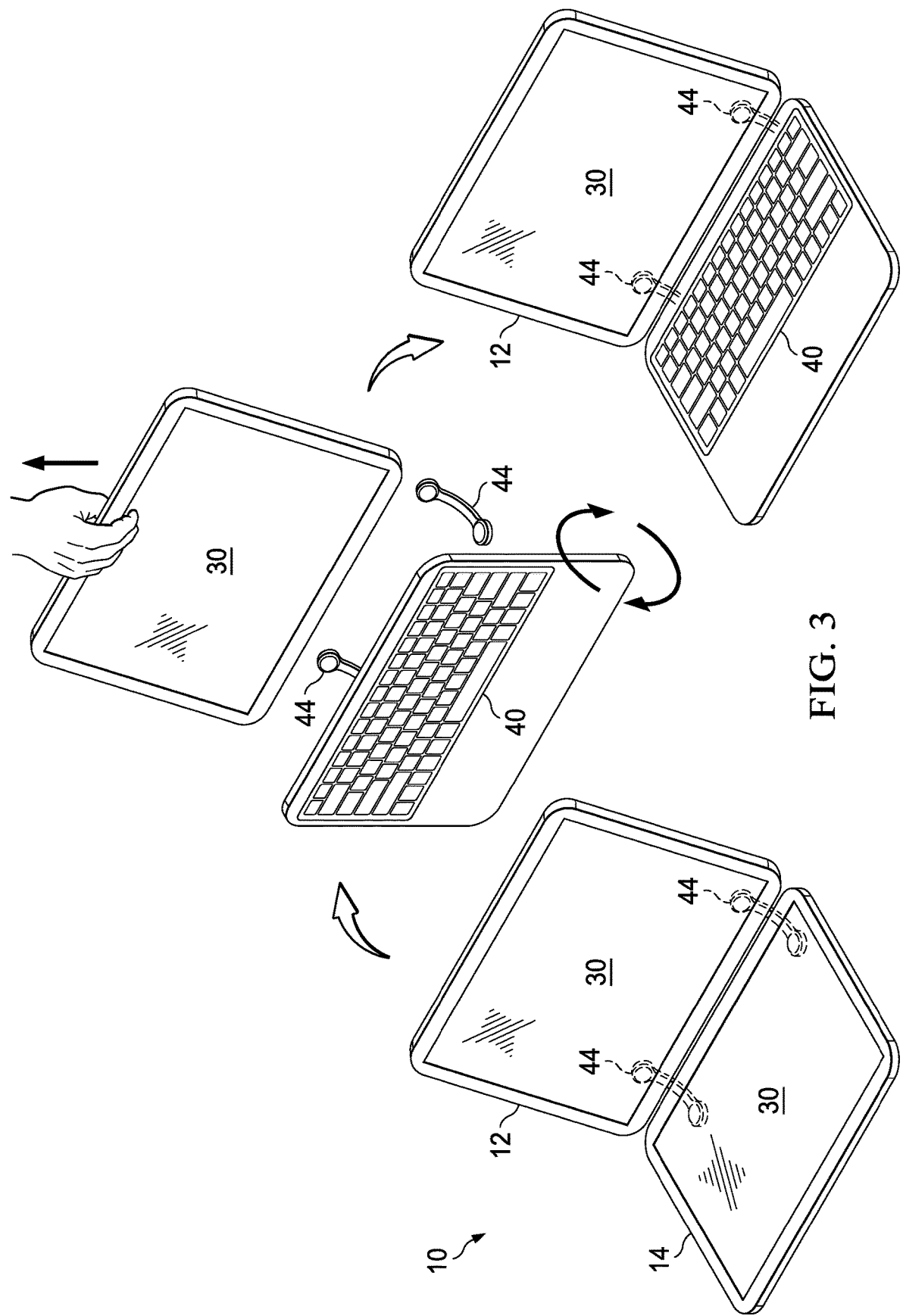
FIG. 3 depicts an example embodiment of a portable information handling system having a detach and flip keyboard configuration.

Referring now to FIG. 3, an example embodiment of a portable information handling system depicts a detach and flip keyboard configuration. An end user grasps a vertically aligned housing portion 12 and a horizontally aligned housing portion 14 to pull the housing portions 12 and 14 apart by detaching at magnetic hinges 44. In the original clamshell configuration before detachment, the horizontal display portion 30 supports a do function, such as a virtual keyboard or writing pad, while the vertical display portion supports a see function that, for instance, accepts inputs made at a user interface of the horizontal display portion. Accelerations monitored at housing portions 12 and 14 may be compared to resolve a separation vector between the housing portions of greater than a predetermined amount, which indicates separation of the housing portions at magnetic hinges 44. In addition, a rotational acceleration of housing portion 14 to expose keyboard 40 while no rotation is detected at housing portion 12 indicates a flip of housing portion 14 to expose keyboard 40 in an exposed position. A detach and flip action may also be detected and/or confirmed by end user grasp and pressure sensing at touchscreen surfaces of display portions 30 as the force to pull apart magnetic hinges 44 will involve a firm end user grasp.

In some instances, housing portions 12 and 14 may be detached to act as separate display portions 30 that continue to cooperate in their presentation of content, such as with wireless communication of display pixel values from a GPU 24 in housing portion 14 through WNICs 34 to timing controller 36 in housing portion 12. When operating as separated housing portions, the relative alignment of housing portions 12 and 14 are considered for coordination of the display of visual images. As an example, a variety of sensors sense conditions that define a context for determining the type and orientation of visual information presented at each display portion 30. For instance, if an ambient light sensor at one housing portion detects little ambient light relative to the other housing portion, a user interface transfers to the display portion associated with relatively high ambient light while the other display portion goes to idle or off. Alternatively, accelerometers, gyroscopes or magnetometers detect orientation of each housing portion relative to gravity and provide the relative orientation to GPU 24, which changes pixel output to provide oriented visual images across both display portions. For instance, a user might have one display portion in a landscape orientation to use as a keyboard while viewing the other display portion in a portrait orientation to run through a column of data on a spreadsheet. In addition to accelerations sensed at each housing portion, eye gaze compared between housing portions may also provide relative alignment of the display portions. Although the example embodiment is explained as one GPU 24 generating pixels, in an alternative embodiment, each display may have its own GPU 24 with orientation managed at an operating system.

Figure 4:
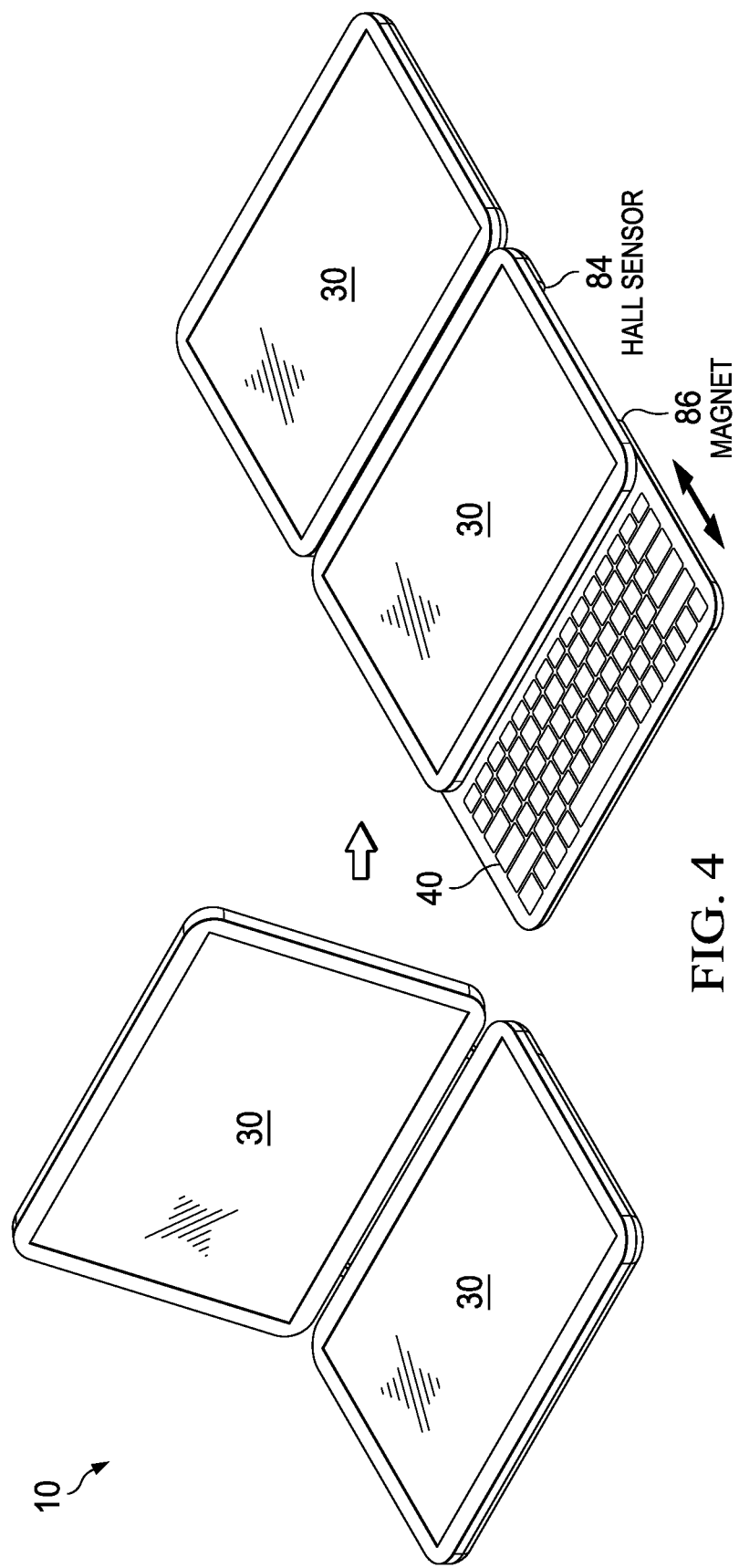
FIG. 4 depicts an example embodiment of a portable information handling system having a keyboard that slides between hidden and exposed positions.

Referring now to FIG. 4, an example embodiment of a portable information handling system 10 depicts a keyboard 40 that slides between hidden and exposed positions. With keyboard 40 hidden, portable information handling system 10 may present a first user interface on display portions 30 in a clamshell configuration or a second user interface in a flat or tablet configuration. For instance, in a clamshell rotational orientation, housing portion 14 acts as a base that rests on a support surface to hold housing portion 12 in a vertical orientation. The horizontal display portion 30 provides a do surface to accept end user touches, such as at a virtual keyboard or with a stylus, while the vertical display portion 30 provides a see surface that presents outputs for visual consumption. In one embodiment, automatic user interface configuration may disambiguate touches differently at a see user interface than at a do user interface, such as turning off touch detection, reducing touch sensitivity of limiting touch input presentations. In contrast, a change of orientation to a flat configuration may convert both display portions 30 to a do surface with a user interface that extends across both display portions, such as to accept stylus touch inputs. In addition, with keyboard 40 retracted, display portion 30 having keyboard 40 underneath may provide an indication to the end user of the keyboard location, such as with an icon presented at the display portion 30. In one embodiment, sensed context is applied to detect or predict an end user's desire to extend keyboard 40 so that the icon or other indication is provided to aid end user location of the keyboard location, such as context derived from a Hall sensor, magnetometer, accelerations, ambient light and the active application at the system.

Keyboard 40 slides out from under housing portion 14 to adapt information handling system 10 to accept typed inputs at keys. A hall sensor 84 detects the relative position of magnet 86 to determine a position of keyboard 40. In one example embodiment, sensed context at information handling system 10, such as an acceleration vector of keyboard 40 that indicates opposing motion of keyboard 40 to housing portion 14, initiates a change to user interface disposition upon confirmation of the keyboard movement by Hall sensor 84. As an example, in a flat orientation with keyboard 40 in the exposed position, a do user interface is placed across display portions 30, such as to accept stylus inputs. If rotation of housing portion 12 to a vertical orientation is detected, the user interface converts to a see user interface at the vertical display portion 30 and reduces the size of the do user interface to the horizontal display portion 30. Should keyboard 40 then be slid into the hidden position, the do user interface at the horizontal display portion 30 may convert to a virtual keyboard to accept keyed inputs. Over time, user selections of different user interfaces in different contexts are stored and applied to aid in presentation of a desired user interface as sensed context changes are detected.

Figure 5:
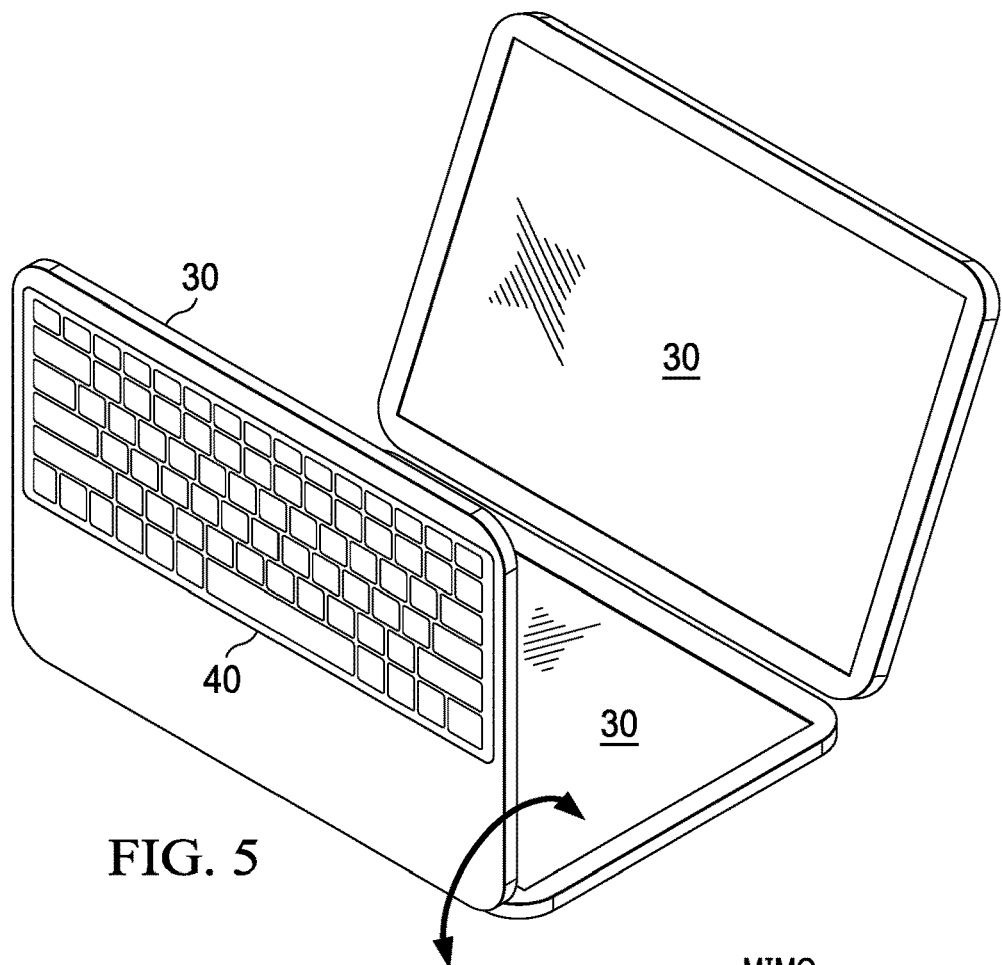
FIG. 5 depicts an example embodiment of a portable information handling system having a keyboard that rotates between hidden and exposed positions.

Referring now to FIG. 5, an example embodiment of a portable information handling system 10 depicts a keyboard 40 that rotates between hidden and exposed positions. Keyboard 40 rotates from a hidden position under information handling system 10 to rest on top of display portion 30. In one embodiment, a display portion 30 may be included on an opposite side of keyboard 40 so that an additional display area may extend outward from housing portion 14 when keyboard 40 rotates only ninety degrees from the bottom surface of information handling system 10. As set forth above, sensed context that resolves keyboard 40 position and user intent automatically initiates user interface changes as housing portions 12 and 14 rotate or separate to have flat or clamshell configurations.

Figure 6:
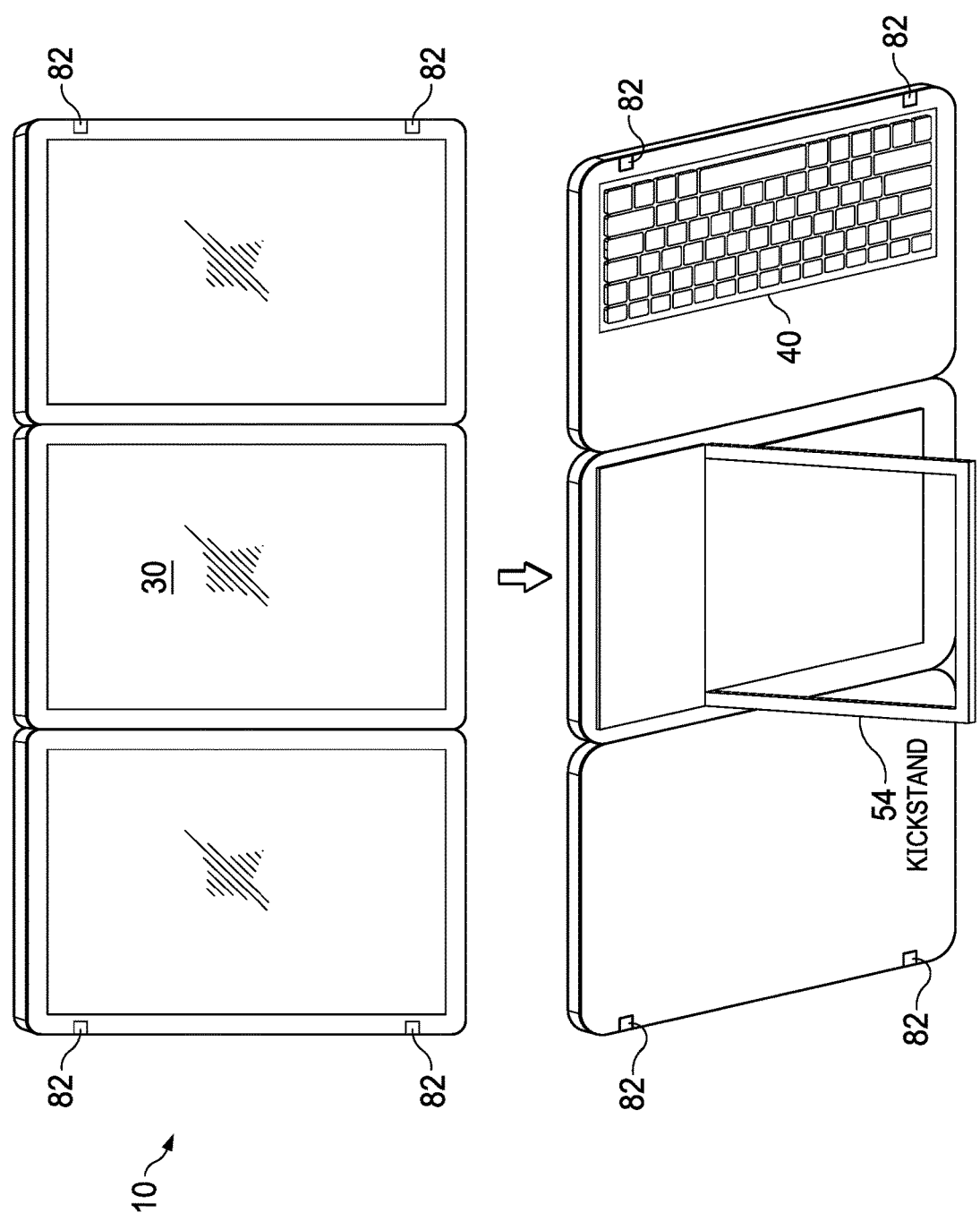
FIG. 6 depicts an example embodiment of a portable information handling system having three rotationally coupled housing portions and display portions that selectively configure to an all-in-one form factor.

Referring now to FIG. 6, an example embodiment of a portable information handling system depicts three rotationally coupled housing portions and display portions that selectively configure to an all-in-one form factor. In the example embodiment, three display portions 30 and a keyboard 40 may configure to a variety of orientations as described above, such as flat and clamshell orientations, each having an associated user interface configuration. In addition, a kickstand disposed on the back surface of the central main housing portions 14 extends outward to support a vertical orientation of all display portions 30 in a flat orientation, similar to an all-in-one information handling system. A context sensed from multi-structural sensors provisions user interfaces, applications and hardware configurations to adapt to an end user's desired interactions. As an example, extension of kickstand 54 to support display portions 30 in a flat configuration with keyboard 40 in a hidden position may initiate a do function since touch inputs against the display portions 30 have the support of kickstand 54. In the example embodiment, a hardware function initiated by the all-in-one orientation is a transition in the use of antenna 82 disposed at different locations of the housing portions 12 and 14. To ensure adequate wireless coverage in different types of orientations, antenna 82 may be disposed at opposing corners of separate housing portions and then cooperatively engaged at 2×2 MIMO antenna selected based upon sensed context. For instance, in a clamshell configuration, two antenna 82 located along one side of the same housing portion cooperate to communicate wireless signals in a MIMO configuration. As information handling system converts to a flat orientation having elevation provided by kickstand 54, all four antenna 82 are engaged to cooperate in a MIMO configuration.

Figure 7:
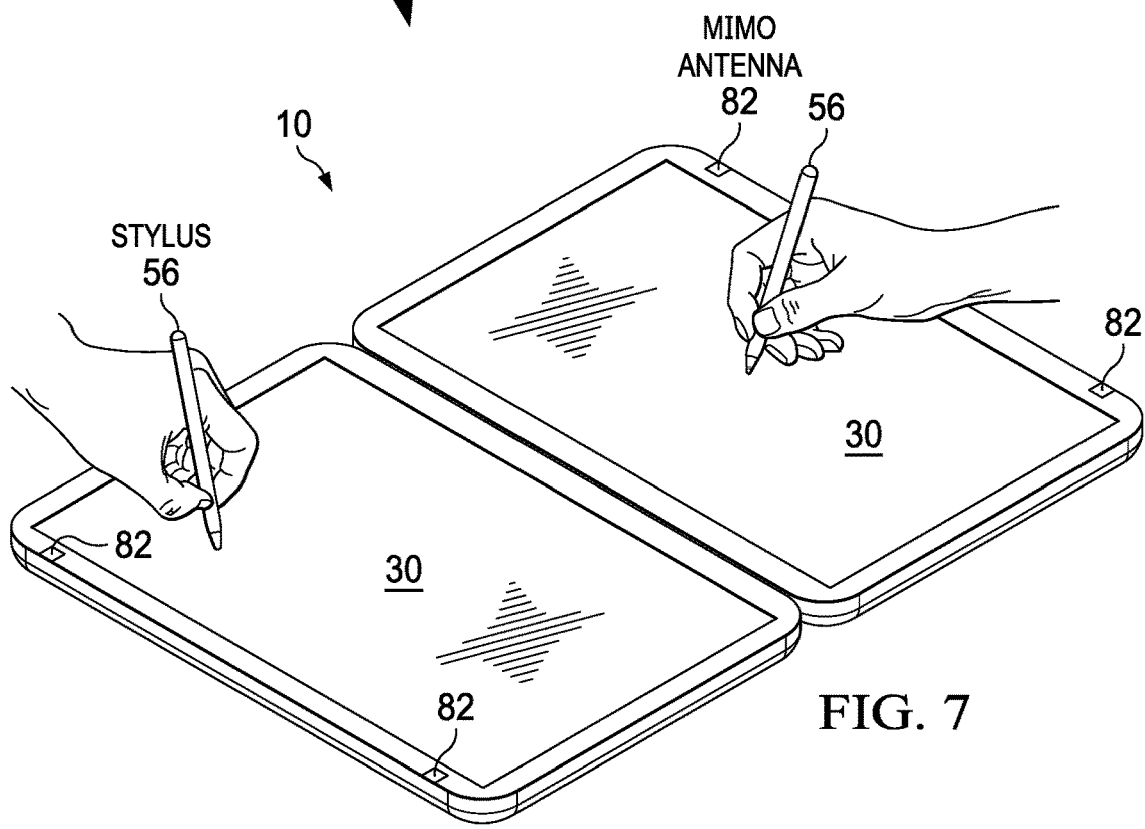
FIG. 7 depicts an example embodiment of a portable information handling system rotated to a flat configuration having a user interface provisioned based upon the number of end users present at display portions.

Referring now to FIG. 7, an example embodiment of a portable information handling system 10 depicts a flat configuration having a user interface provisioned based upon the number of end users present at display portions 30. As set forth above, in an environment having a single end user, end user intent and desires are managed by provisioning user interfaces based upon a sensed context, such as with accelerometers, gyroscopes, magnetometers, gaze trackers, cameras, ambient light sensors, touchscreen detection, keyboard location, kickstand deployment and active applications. In an environment involving two end users, user interfaces may provision to adapt to intent and desires of the multiple end users. For instance, as described above, in a flat orientation a do user interface provisions to accept stylus inputs. In the event that multiple end users are detected, such as by tracking gaze of two sets of eyes, the single do interface remains in place with all content oriented in one direction. If the orientation of one user is different from the other, detection of separate touches by the end users at separate display portions may divide the display area between the two users. As an example, if each end user touches different display portions 30 with different stylus 56, a different user interface is provisioned to each display portion 30 to support each end user. The different user interfaces may be supported by the same processing components or separate components. For example, if only one housing portion 14 has a processor to execute an operating system and application, separate user interfaces may be provisioned by generating separate threads on the processor that define visual images at each display portion 30. If each housing portion has its own processor, then separate user interfaces may be defined by generating visual images with each processor for each display portion. Upon transition away from the presence of two users, two stylus or the flat configuration, a single user environment may again be implemented with the user interface provisioned as described above.

Referring now to FIG. 8, an example embodiment of a portable information handling system 10 depicts provisioning of a user interface between a clamshell rotational orientation and detachment into two separate housing portions. Keyboard 40 location and provisioning in a clamshell orientation may cause end user confusion where a portable information handling system has dual display portions 30 exposed and keyboard 40 in a hidden position. In one embodiment, user interfaces are provisioned on display portions 30 to encourage an end user to place the housing portion having keyboard 40 in a base position. For instance, a virtual keyboard user interface is biased towards presentation at the housing portion that contains the physical keyboard 40. For example, if an end user has information handling system 10 in a flat configuration and then rotates the housing portions to a clamshell configuration, a virtual keyboard is presented on the display portion of the housing portion having keyboard 40 in the hidden position so that the end user will naturally place the keyboard at the horizontal location. If the end user does not place the virtual keyboard at the base location or removes the virtual keyboard, the virtual keyboard might reduce to an icon size at the housing portion having the keyboard 40 or might shift to the other housing portion to accept inputs.

In the example embodiment, applications and user interfaces associated with the applications are provisioned to a display portion 30 in a vertical orientation relative to a virtual keyboard user interface 58. An active user interface 60 is in focus at the vertically oriented display portion 30 while inactive user interfaces 62 are presented in background on both display portions 30. A virtual keyboard user interface 58 presented at the horizontally oriented display portion 30 accepts typed inputs as a do user interface for active application window 60 presented in a see user interface. Although virtual keyboard 58 accepts typed inputs, the lack of feedback at a touchscreen display can make inputs more difficult. In response, an end user detaches the housing portions 12 and 14 and flips housing portion 14 to bring keyboard 40 to an exposed position. During detachment of the housing portions from each, a separating acceleration vector is detected by comparing accelerations at each housing portion and, in response, an animation is initiated at the housing portion 14 having keyboard 40 that compresses visual images into an icon at the display portion 30 of housing portion 12. By showing the animation at the housing portion that needs to be flipped to expose keyboard 40, the end user is provided with an indication of the location of keyboard 40. In the example embodiment, the active window 60 then expands to use the entire display portion area with an intent implied by the end user action of typing into the see user interface. In an alternative embodiment, other user interfaces may be provisioned based upon previous end user interactions. In the event that active window 60 is presented at the housing portion 14 having the keyboard, the animation may include transfer of the content of the active window to the opposing display portion 30 while content at the opposing display portion 30 shrinks to an icon 64 at the same display area. In one embodiment, the inactive user interface windows are stacked in a queue in order of descending priority so the end user can access idle user interfaces in a more rapid manner.

Referring now to FIG. 9, a block diagram depicts information handling system component interactions to support context sensing and user interface provisioning. A hardware layer 66 provides processing and sensing at a physical level. A CPU 18 and RAM 20 execute instructions that manage user interface selection and provisioning. In some embodiments, each housing portion has its own CPU 18 and RAM 20 to separately execute user interface related instructions. A WNIC 34 provides communication between housing portions to present information at separate displays. Where one CPU in one housing portion executes instructions to generate all visual information, a GPU 24 communicates display information as pixel values through WNIC 34. Where separate CPUs coordinate presentation of visual information, WNIC 34 provides communication between the CPUs so that GPUs at each housing portion generate visual images from the information. Sensors 72 sense external context as described above. Generally, sensor input is coordinated through various hardware components, such as an embedded controller, and made available to an operating system for selection of user interfaces to provision.

An operating system layer 68 includes an operating system 74 that executes over CPU 18 and coordinates sensed inputs to determine user interface provisioning. A user interface manager 76 executes as a module within operating system 74 to apply sensed context to determine which user interfaces to provision to which display portion. A user interface queue 78 stores available user interfaces for selection by user interface manager 76. For instance, user interface queue is an ordered list of user interfaces in priority with each user interface associated with context and applications. As a sensed context at an information handling system matches conditions for a user interface in the queue 78, user interface manager 76 initiates the user interface presentation at the appropriate display portion. Applications 80 in an application layer 70 may be initiated based upon the user interface selected, such as word processing, spreadsheet, email, web browsing or other applications.

Referring now to FIG. 10, a flow diagram depicts a process for detecting a user interface provisioning trigger at a portable information handling system. In the example embodiment, a user interface provisioning is detected based upon system accelerations and confirmed with a position sensor, such as a Hall sensor. In alternative embodiments, accelerations may be used to confirm a trigger first detected by another sensor, such as a Hall sensor. The process starts at step 84 with monitoring of accelerations at each housing portion of an information handling system 10. If accelerations exceed a threshold, the process continues to step 86 to determine if the accelerations resolve to an opposing vector of greater than a threshold, such as indicates that housing portions are being pulled apart. If the accelerations are too small or indicate accelerations in a common direction by a contiguous housing, the process returns to step 84.

Once a housing separation is indicated by sensed accelerations, the process continues to step 88 to confirm the housing separation, such as by movement detected at a Hall sensor. In the example embodiment, accelerations with an opposing vector may be sensed at a lid housing portion 12 and a keyboard 40 to detect removal of the keyboard, which is confirmed by a Hall sensor detection of movement of the keyboard relative to a main housing portion. In alternative embodiments, a separation acceleration vector is confirmed by other sensors, such as an ambient light sensor that detects placement of a display portion 30 face down on a surface, such as when a keyboard 40 on the opposing side is placed up. If at step 88 a separation of housing portions is not confirmed, the process returns to step 84. Once housing portion separation is confirmed, the process continues to step 90 to provision user interfaces for the housing portion configuration. In a change to expose a keyboard 40, user interface provision will vary based upon whether the amount of display area has decreased as the keyboard moves to an exposed position. For instance, with a sliding keyboard, the display area over top of the keyboard becomes a do area that accepts touch inputs, such as with a stylus. In contrast, a separate and flip action to expose a keyboard from underneath a display area results in the display area being hidden. In such a situation, an animation of display user interfaces to an icon at the remaining display area helps to remind the end user where the keyboard is located and stacks user interfaces in a priority order at an icon for the end user to select as needed. With disposition of the keyboard to accept inputs, the user interface may select an active window that accepts typed inputs and expand that active window to the entire area of a display portion having a vertical alignment to the keyboard. Following the automatic user interface provisioning, at step 92 any modifications made by an end user to the user interface are stored for use in subsequent user interface provisioning.

Referring now to FIG. 11, a flow diagram depicts a process for selecting see and do user interface scale in a multi-display and multi-user environment. The process starts at step 94 with monitoring of accelerations at information handling system portions to detect rotational vectors. The example embodiment compares accelerations between two housing portions to detect accelerations so that relative orientation of separated housing portions may be tracked, however, in alternative embodiments a rotational orientation sensor at a hinge may be used to detect rotational orientation of housing portions. If at step 96 a change in rotational orientation is detected, the process continues to step 98 to determine if the change in rotational orientation is from a folded to a flat rotational orientation. For instance, if the housing portions have closed or clamshell configuration after motion stops the process continues to step 106 to provision a folded user interface. In various embodiments, the folded user interface can take a number of different forms depending upon whether the housing portions physically couple to each other or are separated from each other. For instance, if the housing portions are separate from each other, the relative orientation of the housing portions to each other is compared to determine an orientation for presenting visual images at each housing portion. Further, see and/or do interfaces may be assigned to each housing portion based upon the content and active window of the information handling system visual images.

At step 98 if a folded to flat orientation is detected, the process continues to step 100 to assign a flat user interface. The flat user interface may have a horizontal content based upon accelerations detected at both housing portions or a vertical content based upon extension of a kickstand in an all-in-one configuration. For instance, in a horizontal flat configuration, a do user interface with inputs accepted using stylus touches may have priority while, in a vertical flat configuration, a see user interface may have priority, such as watching a video. Further consideration for user interface selection may include whether the housing portions are coupled as a contiguous unit or separated from each other as separate units. At step 102, a determination is made of whether one or two end users are making inputs at the information handling system, such as by determining whether one or two stylus devices are touching the display portions. If only one user is making inputs to the information handling system, the process returns to step 94 to continue to monitor accelerations that indicate housing portion re-configuration.

If at step 102 multiple stylus devices are detected, a collaborative user interface may be deployed at step 104 to aid interaction by multiple end users. For example, each display portion of each housing portion may be assigned to one user, such as by generating a separate user interface of the same "do" stylus application at both display portions. The separate user interfaces may be supported with separate threads executing on a shared processor so that a GPU interfaced with the processor sends visual images to both display portions. Alternatively, a separate CPU in each housing portion may execute the do application so that each user has his or her own user interface on which to collaborate. In the example embodiment, the dual user interface configuration is established only if a flat orientation exists with two stylus devices detected. In an alternative embodiment, touch by fingers of two users may establish dual user interfaces where the multiple users are detected by camera or eye gaze analysis. Alternatively, dual separate user interfaces may be initiated only when separate users are detected and a separation between the housing portions is detected.

Figure 12:
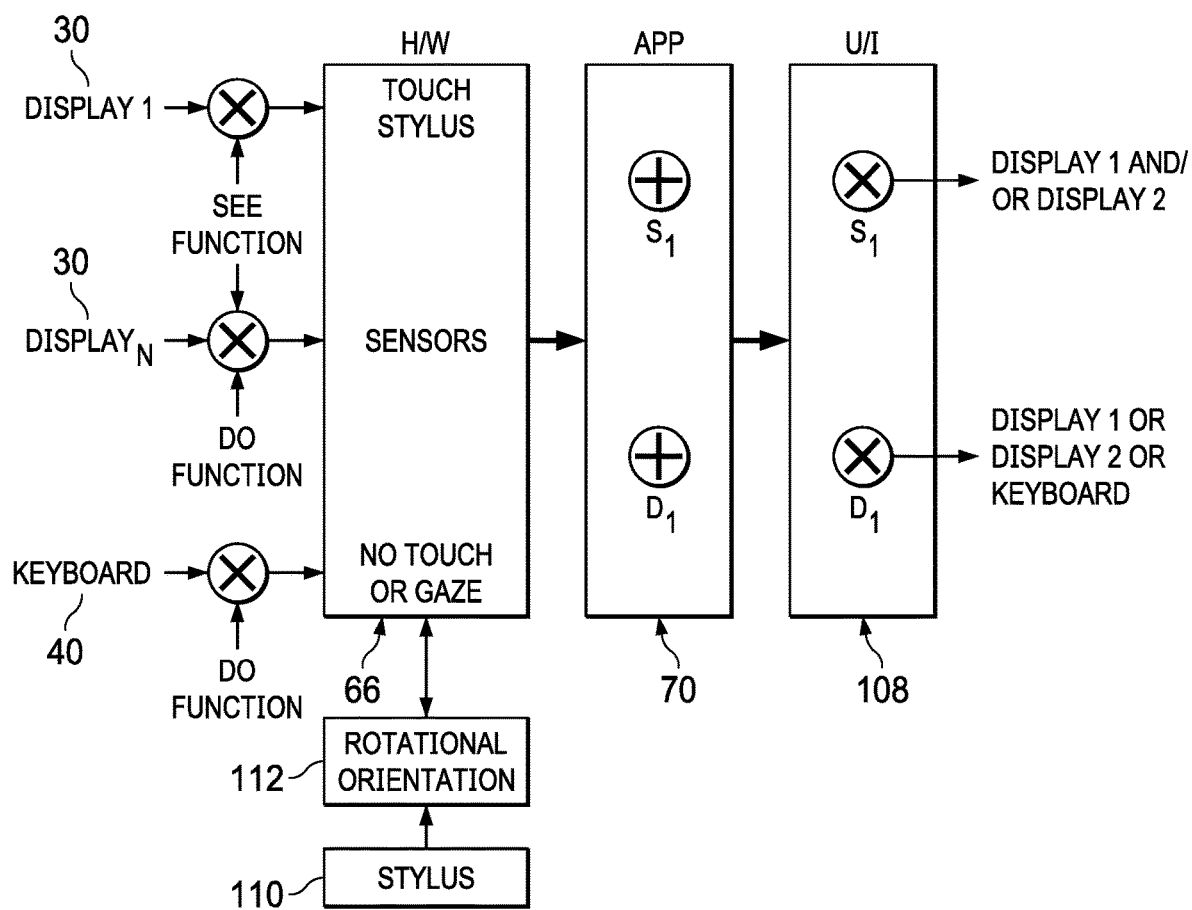
FIG. 12 depicts a block diagram of logical elements applied to determine provisioning of user interfaces in single and dual user modes.

Referring now to FIG. 12, a block diagram depicts logical elements applied to determine provisioning of user interfaces in single and dual user modes. In the example embodiment, user interface logic is tied to first and second display portions 30 and a physical keyboard 40 that selectively transitions between exposed and hidden positions. User interface provisioning is managed by associating functions of the information handling system with do or see functionality. In the example embodiment, do functions perform based upon inputs, such as through touch, a stylus or gesture, while see functions do not perform based upon inputs such as touch, gaze and gesture. In alternative embodiments other definitions may apply and, in some embodiments, a graduated functionality assessment is associated with functions to defined graduated usability with a do function towards less functionality at intermediate see-do functions and a consumption only function with a pure see function. Each display portion 30 may have multiple functions assigned including simultaneous assignment of both see and do functions. In the example embodiment, display portion 1 has a see function, such as a web browser to consume visual information, and display portion n has both do and see functions. Keyboard 40 provides a do function of physical key inputs without presentation of visual images.

A hardware layer 66 detects end user interactions associated with do functions at display portions 30. For example, a touch stylus 110 interacts with a touchscreen to make inputs at a do user interface. Other sensors include gaze tracking, cameras, touch and pointing devices, etc. . . . . At hardware layer 66, accelerations detect rotational orientation of housing portions to determine if display portions 30 have a folded or flat orientation. If multiple stylus devices 110 and a flat rotational orientation 112 are reported to hardware layer 66, a multiple user environment is detected that implies a use of multiple different do user interfaces so that each end user has his or her own user interface with which to interact. An application layer 70 applies the sensed conditions to assign see and do user interfaces to the display portions at a user interface layer 108. As described above, if a flat orientation is detected along with two asynchronous touch inputs that indicate two end users, user interfaces 108 are divided between two display portions for the two users. In one embodiment, a second user may instead have a user interface assigned to him or her at just a part of a display portion 30 so that control of the overall system interactions may rapidly convert to the original user with a touch at the display portion 30 having the second user interface. In another embodiment, once separate user interfaces are assigned to each stylus, the stylus is restricted to only input to its assigned user interface while inputs at the other user interface are ignored. In yet another embodiment, only one user is assigned to the user interface unless a flat orientation is detected and the keyboard is in a hidden position.

Figure 13:
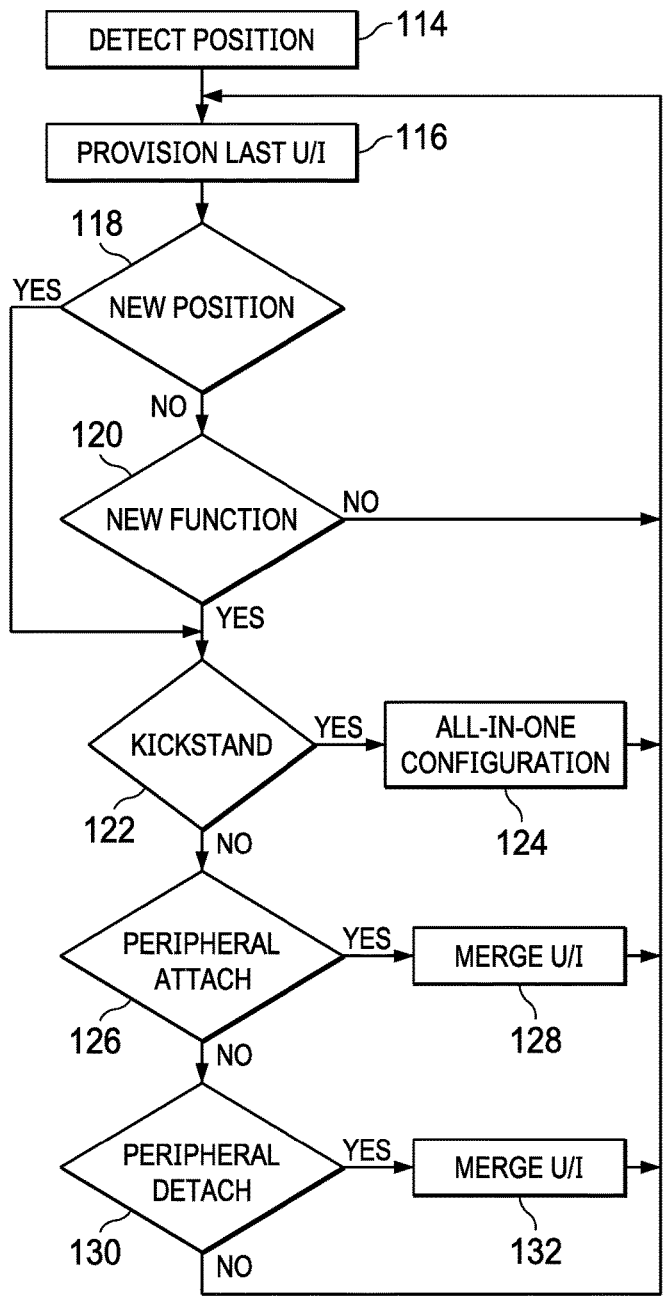
FIG. 13 depicts a flow diagram of a process for provisioning user interfaces based upon detection of housing portion positions.

Referring now to FIG. 13, a flow diagram depicts a process for provisioning user interfaces based upon detection of housing portion positions. The process starts with detection of housing portion position at application of power to the information handling system at step 114. At step 116 the last user interface for the detected position is provisioned for presentation at the display portions. Once the information handling system powers up, the process continues to step 118 to monitor sensed context and adapt user interface provisioning as housing portion positions and selected functions change. At step 118 a determination is made of whether the housing portions have assumed a new position and step 120 determines if a new function has been selected. If the position and function remain unchanged, the process returns to step 116 to continue monitoring sensed context. If either the housing portion position or the function have changed, the process continues to step 122 to determine what new user interface should be provisioned, if any.

At step 122, a determination is made of whether a kickstand has extended from a portable housing. If a kickstand has extended, the process continues to step 124 to establish an all-in-one configuration. For example, upon detection of the extension of the kickstand a determination is made of the display portions that share a common plane supported by the kickstand and the most recent user interface associated with the all-in-one configuration is presented at the shared display portions. Alternatively, based on other sensed context a user interface and associated content is selected for presentation. If at step 122 the kickstand remains retracted, the process continues to step 126 to determine if a peripheral is attached to the system, such as through a wired or wireless interface. In various embodiments, the peripheral may include an external keyboard, mouse, display or other physical device that interacts with the information handling system. If a peripheral is detected, the process continues to step 128 to merge any user interface associated with the peripheral to the user interface currently presented. For example, upon detection of a peripheral keyboard a do user interface associated with typed inputs, such as wording processing, adjusts from a horizontal to a vertical position and adapts to accept inputs from the keyboard instead of a stylus. If instead a peripheral device has disconnected at step 130, the user interface that was associated with the peripheral device merges at step 132, such as by transitioning to a do user interface having a vertically aligned display portion to a horizontally aligned display portion. The process then returns to step 116 to continue monitoring for function or position changes.

Figure 14:
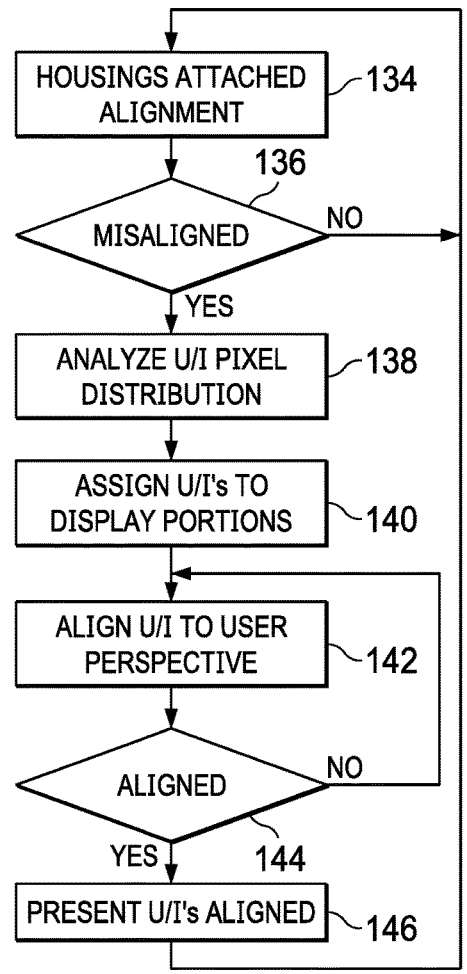
FIG. 14 depicts a flow diagram of a process for provisioning user interfaces based upon housing portion alignment and display portion content.

Referring now to FIG. 14, a flow diagram depicts a process for provisioning user interfaces based upon housing portion alignment and display portion content. The process starts at step 134 with housing portions attached to each other, such as with a hinge, so that attached sides have a proximate and parallel alignment. At step 136, a determination is made of whether a misalignment has occurred between the housing portions, and if not, the process returns to step 134 to continue monitoring alignment. A determination of misalignment may be made with several different sensed conditions. Initially, misalignment may be detected by an opposing acceleration vector between two housing portions, such as may be experienced when two housing portions are pulled apart at a detachable magnetic hinge. Other indications might include a different gaze angle from each housing portion relative to an end user, a camera image captured at each housing portion that shows different relative angles to a reference point, such as an end user or building reference landmark, an acceleration or magnetic sensed direction to an Earth reference point that resolves to different angles at each housing portion, different levels of ambient light sensed at each housing portion, etc. . . . . .

If a misalignment exists between the housing portions, a separation of the housing portions is indicated with associated impacts on the user interface selection. For example, although each display portion in each housing portion shares information for presentation, a cohesive presentation between both display portions depends on the spacing between the housing portions and the angular relationship from the user to the display portion. At step 138, an analysis is performed of the user interfaces as presented to determine the percentage of pixels dedicated to each user interface, including an active window selected by the end user for interaction and inactive windows. In one embodiment, the user interface having the greatest amount of content across the display portions is presented across all of the display portion that remains the focus of the end user. Alternatively, an active window regardless of the relative size of its content is selected for presentation across all of the display portion that remains the focus of the end user. In one embodiment the focus of the end user is assumed to remain at the display portion that lacks a keyboard. In another embodiment, the focus of the end user is determined from a determination of eye gaze at the two displays.

At step 140 the user interfaces are assigned to display portions based upon priority, such as the percent of display area taken by the content of each user interface or the end user's selection of an active window. In one embodiment, the active user interface may be presented at separate display portions, such as may aid with collaboration by two users. In alternative embodiments, upon separation a separate user interface may be called for presentation based upon an end user's intent as determined from sensed content. At step 142, the user interface at each display portion is aligned to the end user's perspective. For instance, although physically separated from each other, the display portions continue to coordinate presentation of visual images as if in an aligned relationship. Thus, as the housing alignment shifts to a misaligned condition, the user interface remains aligned by coordinating presentation of visual images relative to each other and/or the end user. For instance, an end user might separate housing portions from a clamshell configuration, rotate one housing portion to a portrait view, and then use the other housing portion in a landscape view as a keyboard to type inputs to a column of a spreadsheet presented in the portrait view. At step 144, the housing portion relative alignment is checked to determine if the user interfaces remain misaligned and, if so, the process returns to step 142 to continue to adjust the user interface orientation relative to the housing portion orientation to present the visual images at both display portions aligned to each other. If the user interfaces align at step 144, the process continues to step 146 to present the user interfaces aligned with the housing portion alignment. For example, alignment of the user interfaces occurs upon reattachment of the housing portions to each other. Reattachment may be indicated in part by an acceleration vector resolved between the two housing portions that indicate a coupling followed by a bump at physical connection. Granularity in alignment correction is provided by adjusting the scan provided by the graphics processor to the display portions. As described above, pixels values may be generated with a CPU and GPU in one of the housing portions and wirelessly communicated between the housing portions, or may be generated with a GPU in each housing portion.

Although the present invention has been described in detail, it should be understood that various changes, substitutions and alterations can be made hereto without departing from the spirit and scope of the invention as defined by the appended claims.

What is claimed is:

1. An information handling system comprising:
    a first housing portion;
    a first display portion coupled at a first side of the first housing portion and operable to present information as visual images;
    a second housing portion;
    a second display portion coupled at a first side of the second housing portion and operable to present information as visual images;
    a hinge rotationally coupling the first and second housing portions to rotate between a closed position hiding the first and second display portions and at least a tablet position exposing the first and second display portions in a common plane;
    plural components disposed in the first and second housing portions that cooperate to process information, the information presented as visual images at the first and second display portions;
    a keyboard engaged with the first housing portion at a side opposite the first display portion, the keyboard having a hidden position that hides keyboard keys and an exposed position that exposes the keyboard keys;
    a Hall sensor having first and second Hall sensor elements disposed in the first housing portion and keyboard, the Hall sensor configured to sense the hidden and exposed positions;
    plural accelerometers, at least one of the plural accelerometers disposed in each of the first housing portion, the second housing portion and the keyboard to detect accelerations at each of the first housing portion, second housing portion and keyboard; and
    a keyboard controller interfaced with the keyboard, the Hall sensor and the plural accelerometers, the keyboard controller operable to compare accelerations of the keyboard and the second housing portion to provision a first or second user interface presented at the first and second display portions, the first user interface configured for touch inputs, the second user interface configured for keyboard inputs;
    wherein the first housing portion detaches from the hinge, the first housing portion attaching at the hinge in a first orientation having the keyboard exposed or a second orientation having the keyboard hidden.

2. The information handling system of claim 1 wherein the keyboard controller is further operable to:
    Detect a keyboard configuration if the keyboard and second housing portion have a perpendicular acceleration vector of a predetermined amount; and
    Confirm a keyboard configuration if the Hall sensor senses the exposed position.

3. The information handling system of claim 2 wherein the keyboard controller disables touch detection at the first display portion in response to detecting a keyboard configuration.

4. The information handling system of claim 1 further comprising a sliding support engaging the keyboard and first housing portion in a sliding relationship, wherein the keyboard slides relative to the first housing portion between the hidden and exposed positions.

5. The information handling system of claim 4 wherein the first user interface includes an indicator of the keyboard location in the hidden position.

6. The information handling system of claim 1 further comprising:
    a first ambient light sensor exposed at the first display portion to measure ambient light; and
    a second ambient light sensor exposed at the second display portion to measure ambient light;
    wherein the keyboard controller detects the exposed and hidden positions by comparing ambient light detected by the first and second ambient light sensors.

7. The information handling system of claim 6 wherein keyboard controller initiates a stacked user interface at the second display portion upon detection of the keyboard exposed position.

* * * * *